H. LANDMAN.
ICE CREAM DIPPER MOLD.
APPLICATION FILED JULY 26, 1917.
1,278,686.
Patented Sept. 10, 1918.
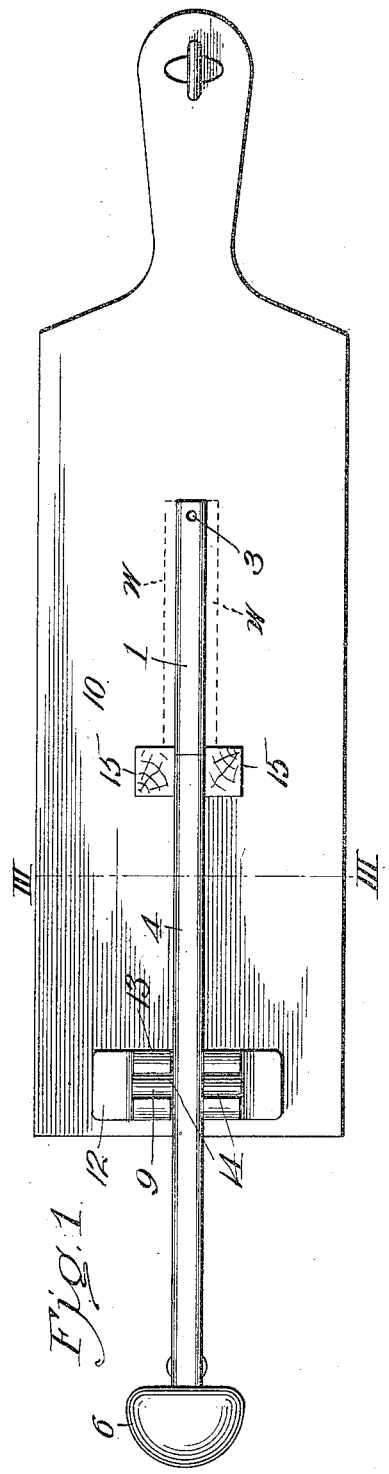
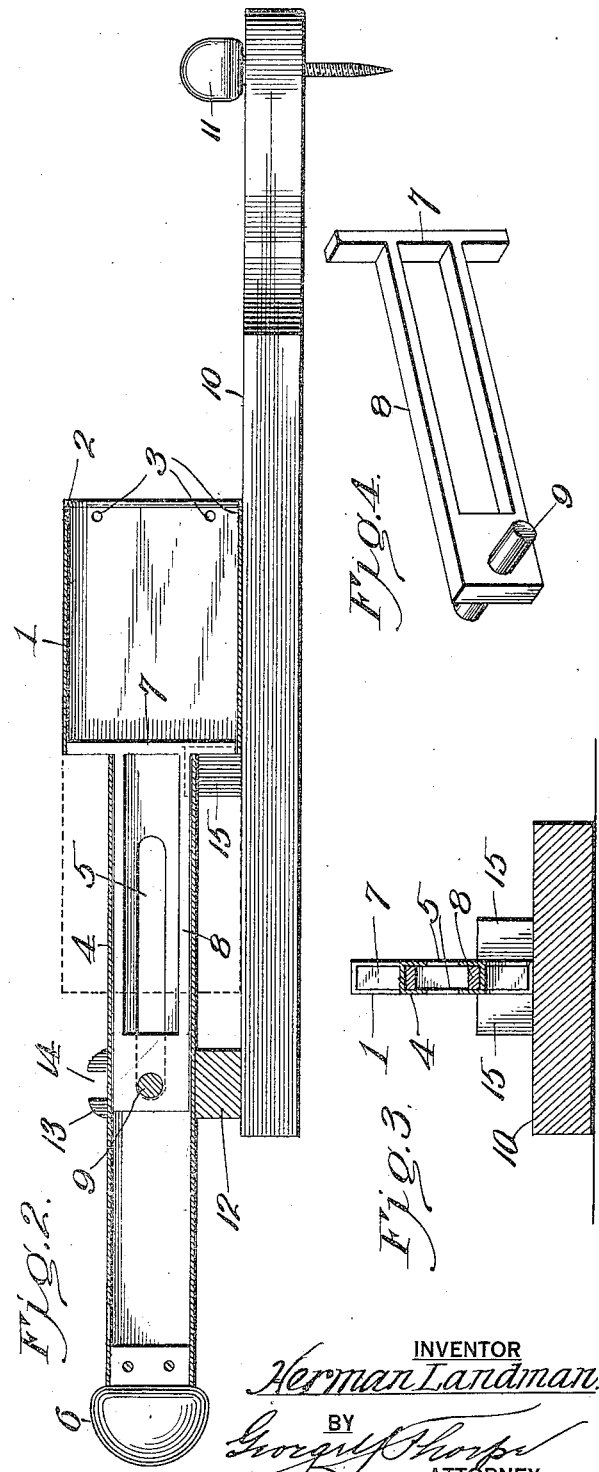
INVENTOR
Herman Landman.
BY
George J. Thorpe
ATTORNEY

UNITED STATES PATENT OFFICE.

HERMAN LANDMAN, OF KANSAS CITY, MISSOURI.

ICE-CREAM DIPPER-MOLD.

1,278,686.  Specification of Letters Patent.  Patented Sept. 10, 1918.

Application filed July 26, 1917. Serial No. 183,364.

*To all whom it may concern:*

Be it known that I, HERMAN LANDMAN, a citizen of the United States, residing at Kansas City, in the county of Jackson and State of Missouri, have invented certain new and useful Improvements in Ice-Cream Dipper-Molds, of which the following is a specification.

This invention relates to combined ice cream dippers and molders, and has for its object to produce a device of this character whereby slices of ice cream can be easily and quickly produced from the can wherein it was made. Another object is to produce a combined dipper and molder from which the slice of cream can be instantly extracted and placed between waffles to form an ice cream sandwich, or into a box or dish without the cream coming in contact with the operator's hands.

A further object is to produce a device to form a guide or support for a pair of waffles, and a means to coöperate in effecting the withdrawal of the mold from and the placing of the molded slice of cream between such waffles.

With these general objects in view the invention consists in certain novel and peculiar features of construction and organization of parts as hereinafter described and claimed, and in order that the invention may be fully understood reference is to be had to the accompanying drawing, in which:

Figure 1, is a plan view of an ice cream slice producing and extracting appliance embodying my invention.

Fig. 2, is a view partly in side elevation and partly in central vertical section.

Fig. 3, is a cross section on the line III—III of Fig. 1.

Fig. 4, is a detail perspective view of the plunger of the appliance.

In the said drawing, 1 is a rectangular dipper-mold of substantially the same area as a pair of flat rectangular waffles customarily used in making ice cream sandwiches. At the front end the walls are beveled at 2 to produce a sharp edge which will readily cut into hard frozen cream in the bulk, that is as it is produced in a freezer, and formed in the walls of the combined dipper-mold, adjacent the front end thereof are drain holes 3. At its rear end the combined dipper-mold is formed with a tubular handle 4 of the same width as the dipper-mold but of reduced height so that between said handle and the bottom and top edges or walls of the dipper-mold, openings are provided for the egress of air when the device is thrust into a body of cream, and the sides of said handle are provided with long slots 5. 6 is a knob secured to the rear end of the handle 4 to provide a convenient point upon which to apply pressure in thrusting the device into a mass of ice cream.

Fitting slidingly in the combined dipper-mold is a plunger or extractor 7, the same being provided with a stem 8 fitting in the tubular handle 4, and provided at its rear end with a cross pin 9 projecting laterally through the longitudinal slots 5, which limit the relative travel of the plunger or extractor within the dipper-mold, that is to say when the dipper-mold is thrust down into a body of cream, it becomes fully charged with a slice of cream, the latter as is is forced into the dipper-mold by the pressure applied on the knob of the same, forcing the plunger from the extreme front end of the dipper-mold to the position shown in Fig. 2, it being obvious that the plunger in moving to this position is unopposed, as the air escapes through the openings mentioned above and below the handle 4, and in this movement of the plunger the pin 9 moves from the front to the rear ends of the slots 5. As this result is accomplished the device is withdrawn from the freezer or can containing the ice cream, and placed as shown perpendicularly edgewise, upon an anchoring or holding device, the same being constructed as follows: 10 is a board to be detachably secured by a screw or clamp 11 or otherwise, to a table or support (not shown), and said board is provided near its rear end with a bracket 12 bifurcated to provide a pair of upright arms 13 to engage opposite sides of the handle 4 when the combined dipper-mold is placed as explained upon the board, the block also serving as an underlying support for the handle. The arms 13 are provided with notches 14 to receive the ends of the pin 9 and constitute an anchor for preventing movement of the plunger 7 without interfering with reciprocatory movement in a rearward direction of the combined dipper-mold to the position shown by dotted lines, Fig. 2.

To aid in holding the combined dipper-mold upright, the board 10 is provided with a pair of posts 15 spaced to receive the dipper-mold slidingly between them and to provide abutments for the rear ends of a pair of waffles W, placed flatly against opposite sides of the dipper-mold with their lower edges resting on the board and their rear edges resting against the posts 15, in which position they can be held with light pressure so as to move inward as the dipper-mold is withdrawn and clasp the slice of ice cream between them, it being understood that the cream is held stationary because of the immovability of the plunger. The operation described can be performed with great rapidity and in most sanitary manner, as the cream does not come in contact with the hands at any stage of the operation—in fact a sheet of tissue paper may be employed to hold the waffles in place in the production of the ice cream sandwich so that the latter may be handed to the purchaser with the tissue paper around it.

After each sandwich is made as described, the operator lifts the combined dipper-mold from position by the knob 6 and thrusts it into a bucket of water for the purpose of maintaining the temperature at such a point that the extraction of the cream can be performed easily and quickly. As the device is lifted from the board, the plunger slides forward to a position slightly beyond the perforations 3, and as it is lifted from the bucket the water drains through said openings.

It is preferable that the bracket 12 shall be detachable from the board and that the pin 9 shall be removable from the plunger stem so that the appliance may be dismantled if desired.

The dipper-mold is designed chiefly for use in making ice cream sandwiches from bulk ice cream, but it is obvious that the device can be made in such proportions as to produce slices of cream suitable for serving on a plate or blocks of cream for deposit in a carton or box, such deposit being conveniently effected by slipping the latter over the front end of the dipper-mold so that when the latter is withdrawn the box will be charged with the block of cream.

From the above description it will be apparent that I have produced a dipper-mold which embodies the features of advantage enumerated and while I have described and claimed what now appears to be the preferred form of the device, it is to be understood that I reserve the right to make such changes as fall within the spirit and scope of the appended claims.

I claim:

1. An ice cream dipper-mold of rectangular form equipped with a handle and adapted for reciprocatory endwise movement, a plunger fitting slidingly within the mold, means to arrest the reciprocatory movement of the mold when its front end and the front face of the plunger are substantially flush, means for supporting the mold in a perpendicular position without interfering with its reciprocatory movement and means to anchor the plunger during such movement.

2. An ice cream dipper-mold of rectangular form and equipped with a hollow handle having a gripping knob, and a plunger fitting in the dipper-mold and provided with a stem within said handle; said stem and handle having a pin-and-slot connection for limiting relative sliding movement between the dipper-mold and plunger, and means to support the dipper-mold in a perpendicular position on one of its side edges, and guide the dipper-mold when slid rearwardly and anchor the plunger during such sliding action of the dipper-mold.

3. An ice cream dipper-mold of rectangular form and equipped with a hollow handle having a gripping knob, and a plunger fitting in the dipper-mold and provided with a stem within said handle; said stem and handle having a pin-and-slot connection for limiting relative sliding movement between the dipper-mold and plunger, a board to support the dipper-mold in a perpendicular position on one of its side edges, means projecting from the board to hold the stem of the dipper-mold horizontal and prevent it from tipping sidewise and to anchor the plunger, and means to assist in holding the dipper-mold perpendicular and to form an abutment for the rear end of an object or objects fitting against opposite sides of the dipper-mold.

4. An ice cream dipper-mold of rectangular form and provided with a longitudinally slotted rearwardly projecting handle, a plunger fitting in the dipper-mold and provided with a stem within said handle, a cross pin extending through the slotted handle and secured to said stem for limiting relative sliding movement between the dipper-mold and plunger to a distance slightly less than the length of the former, a board provided with a pair of upwardly projecting posts slightly spaced apart to receive the dipper-mold between them, and with a bracket bifurcated in line with the space between said posts to provide a pair of lugs spaced apart the same distance as said posts are spaced apart to receive the handle of the dipper-mold between them; said arms being also bifurcated to receive the cross pin of the stem of said plunger.

5. An ice cream dipper-mold of rectangular form and open at both ends, and provided at its front end with perforations and at its rear end with a handle, means to support the mold on one of its side edges without preventing endwise movement of the mold, a plunger fitting slidingly in the mold, and means to hold the plunger stationary when the mold is reciprocated.

6. An ice cream dipper-mold of rectangular form open at its ends and provided near its front end with drain holes, a plunger fitting slidingly in the mold, and means for arresting forward movement of the plunger after it has attained a position forward of the drain holes.

In testimony whereof I affix my signature.

HERMAN LANDMAN.

Copies of this patent may be obtained for five cents each, by addressing the "Commissioner of Patents, Washington, D. C."